United States Patent
Stagge

(10) Patent No.: US 10,856,633 B2
(45) Date of Patent: Dec. 8, 2020

(54) BISTABLE SPRING STAND AND HOUSING FOR A HANDHELD DEVICE

(71) Applicant: Scooch, LLC, Noblesvile, IN (US)

(72) Inventor: John A. Stagge, Noblesville, IN (US)

(73) Assignee: Scooch, LLC, Noblesville, IN (US)

( * ) Notice: Subject to any disclaimer, the term of this patent is extended or adjusted under 35 U.S.C. 154(b) by 0 days.

(21) Appl. No.: 16/250,812

(22) Filed: Jan. 17, 2019

(65) Prior Publication Data

US 2019/0216195 A1      Jul. 18, 2019

Related U.S. Application Data

(60) Provisional application No. 62/618,166, filed on Jan. 17, 2018.

(51) Int. Cl.
*A45C 11/00* (2006.01)
*B60R 11/02* (2006.01)
(Continued)

(52) U.S. Cl.
CPC ............... *A45C 11/00* (2013.01); *B60R 11/02* (2013.01); *B60R 11/0241* (2013.01);
(Continued)

(58) Field of Classification Search
CPC ............... A45C 11/00; A45C 2011/002; A45C 2200/15; A45F 2200/0516; A45F 5/10;
(Continued)

(56) References Cited

U.S. PATENT DOCUMENTS 6,321,923 B1    11/2001  Wood
8,522,965 B1    9/2013   Hsiung
(Continued)

FOREIGN PATENT DOCUMENTS

CN     302513001     7/2013
CN     203194032     9/2013

OTHER PUBLICATIONS

"My Favorite Case Redesigned! Scooch Case", YouTube video posted Aug. 4, 2017, https://www.youtube.com/watch?v=0NDeAnGgPkQ. (Year: 2017).*
(Continued)

*Primary Examiner* — Justin M Larson
(74) *Attorney, Agent, or Firm* — Frost Brown Todd LLC; Dennis S. Schell; Kevin C. Oschman

(57) ABSTRACT

A bistable spring stand and housing for a handheld device which can be reliably mounted in environments where users commonly mount handheld devices is disclosed. Embodiments include a housing and a bistable spring stand coupled to the housing. The bistable spring stand is moveable between a first position and a second position. In the first position, the bistable spring stand is substantially flat between its first and second ends and in the second position the bistable spring stand defines a longitudinal curve outward from the housing between its first and second ends. At least one embodiment includes a plurality of raised members forming a perimeter around the bistable spring stand, the raised members defining a planar support surface to provide a stable resting surface for the housing and handheld device when the bistable spring stand is in the first position.

21 Claims, 8 Drawing Sheets

(51) Int. Cl.
*H04B 1/3888* (2015.01)
*H04B 1/3877* (2015.01)
*B60R 11/00* (2006.01)

(52) U.S. Cl.
CPC ......... *H04B 1/3877* (2013.01); *H04B 1/3888* (2013.01); *A45C 2011/001* (2013.01); *A45C 2011/002* (2013.01); *A45C 2011/003* (2013.01); *A45C 2200/15* (2013.01); *B60R 2011/0008* (2013.01); *B60R 2011/0059* (2013.01); *B60R 2011/0075* (2013.01)

(58) Field of Classification Search
CPC ....... B60R 2011/007; B60R 2011/0008; B60R 11/0241; B60R 11/02
USPC .................................. 224/929, 930, 183, 562
See application file for complete search history.

(56) References Cited

U.S. PATENT DOCUMENTS

| | | | |
|---|---|---|---|
| 8,636,183 B1 * | 1/2014 | Steiner | B60R 11/02 224/483 |
| D717,780 S | 11/2014 | Tussy | |
| D719,951 S | 12/2014 | Fenton | |
| 8,960,630 B2 * | 2/2015 | Fu | F16M 11/10 248/371 |
| 8,973,795 B2 * | 3/2015 | Chiu, Jr. | A45F 5/021 224/218 |
| D738,872 S | 9/2015 | Erickson-Davis et al. | |
| 9,179,762 B2 * | 11/2015 | Paugh | A45F 5/004 |
| D756,339 S | 5/2016 | Tussy | |
| D761,240 S | 7/2016 | Ozolins et al. | |
| D763,857 S * | 8/2016 | Dang | D14/440 |
| D775,114 S | 12/2016 | Khalili | |
| D777,162 S | 1/2017 | Erickson-Davis et al. | |
| D778,275 S | 2/2017 | Gabriel et al. | |
| D780,166 S | 2/2017 | Lin | |
| 10,117,505 B1 * | 11/2018 | Alvarez | A45F 5/00 |
| D840,988 S | 2/2019 | Kim | |
| D841,636 S | 2/2019 | Turk | |
| D855,606 S * | 8/2019 | Kim | D14/250 |
| D857,005 S * | 8/2019 | Yu | D14/253 |
| D860,984 S * | 9/2019 | Stagge | D14/250 |
| 10,419,054 B1 * | 9/2019 | VanTassell | H04M 1/6041 |
| 2012/0074291 A1 | 3/2012 | Fu | |
| 2016/0345695 A1 | 12/2016 | Stagge | |
| 2019/0216195 A1 * | 7/2019 | Stagge | H04B 1/3877 |
| 2019/0221347 A1 * | 7/2019 | Foley | F16M 13/02 |
| 2020/0170392 A1 * | 6/2020 | Freimuth | H04B 1/3888 |
| 2020/0214408 A1 * | 7/2020 | Shin | F16M 13/005 |
| 2020/0235770 A1 * | 7/2020 | Yim | H04M 1/026 |

OTHER PUBLICATIONS

Notice of Allowance issued by the USPTO dated May 21, 2019 for U.S. Appl. No. 29/629,248.
Case-Mate Snap Case for the iPhone 4 and 4s; Looney Tek; Retrieved from: https://www.youtube.com/watch?v=U39C61Hn7nQ; published on Mar. 31, 2012.
Scooch LLC, Clipstic Pro Cases, Available on Internet Archive Wayback Machine at <URL: https://web.archive.org/web/20160205142047/http://scoochcase.com>, Feb. 5, 2016.
Scooch Wingman 5-in-1, posted at amazon.com, posting date by Sep. 19, 2017, [online], [site visited May 7, 2019]. Available from Internet, <URL: https://www.amazon.com/Scooch-Wingman-Samsung-Galaxy-Clear/dp/B072R58TXM> (Year: 2017).

* cited by examiner

BISTABLE SPRING STAND AND HOUSING FOR A HANDHELD DEVICE

CROSS REFERENCE TO RELATED APPLICATIONS

This application is a nonprovisional of and claims the benefit of U.S. Provisional Patent Application 62/618,166, filed Jan. 17, 2018, and titled Bistable Spring Stand and Housing for a Handheld Device, the entirety of which is hereby incorporated herein by reference.

TECHNICAL FIELD

Embodiments of this disclosure relate generally to handheld devices, for example smartphones, mobile phones, electronic music players, data storage devices, and computers, and more particularly to accessories for handheld devices.

BACKGROUND

Many handheld devices are mounted in upright positions in vehicles and/or other environments common for easy viewing and device interaction. In such environments, mounting accessories typically remain fixed in place after the handheld device is removed. Some prior art handheld devices include a housing (e.g., a fitted case) for the handheld device with an integral extendable stand or "kick stand" on the side opposite the screen. The extendable stand is used to position the handheld device upright on a table or to hold it between a user's fingers. However, in a vehicle, the prior art extendable stands and housings do not securely hold the handheld device within a slot, for example, an air vent or CD player slot within a vehicle dashboard, particularly in a position which would allow the driver to use the handheld device for tasks such as navigation or receiving a call. The housings and extendable kick stands of the prior art do not retain a handheld device securely. Additionally, the housings and stands of the prior art are not compatible with other mounting systems requiring a flat rear surface. However, since a kick stand is not always the most effective method for mounting an associated device to a vertical surface without a slot, some environments still require alternative capabilities.

Further, prior art extendable bistable spring stands and housings for handheld devices can often be unstable when resting on a flat surface due to the curved surface of the a bistable spring protruding from one side of the housing. Therefore, the handheld device inconveniently rocks back and forth during use while laying on a flat surface.

Still further, those same stands and housings in the prior art can change positions unexpectedly and without intention by the user. For example, bistable spring stands and housings of the prior art often extend to a kick stand position upon receiving even small amounts of pressure. Unintentional kick stand extension can be an inconvenience for a user as it often occurs after external pressure is applied while the bistable spring stand is resting in a user's pocket, thereby making it difficult to retrieve the handheld device from the pocket.

It was appreciated by the inventors of the present disclosure that advantages can be realized by providing a bistable spring stand and housing for a handheld device which can be reliably mounted in environments where users commonly mount handheld devices, e.g., on vehicle air vents, as well as providing such an apparatus which does not unexpectedly alter its position when it comes in contact with other objects. The present disclosure is responsive to at least such an endeavor and at least some embodiments are directed to one or more of the problems or issues set forth above and may be directed to other problems as well.

SUMMARY

Embodiments of the present disclosure provide an improved bistable spring stand and housing for a handheld device.

In accordance with one embodiment of the present disclosure, a bistable spring stand and housing can include a housing having a first side and a second side. A bistable spring can be coupled to the housing and can have a first end and a second end and can define an outward facing surface therebetween. The bistable spring can be moveable between a first position and a second position, in the first position the bistable spring can be substantially flat between the first and second end, and in the second position the bistable spring can define a longitudinal curve outward from the housing.

In accordance with another embodiment of the present disclosure, a plurality of raised members can be located on the second side of the housing and can define a planar support surface. The bistable spring can be recessed within the planar support surface while in the first position such that the plurality of raised members extend perpendicularly a distance from the housing which can be greater than that of the outward facing surface of the bistable spring.

In accordance with another embodiment of the present disclosure, a ferromagnetic member can be coupled to at least one of the plurality of raised members, wherein the ferromagnetic member can allow for the apparatus to be vertically mountable to a ferrous surface.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
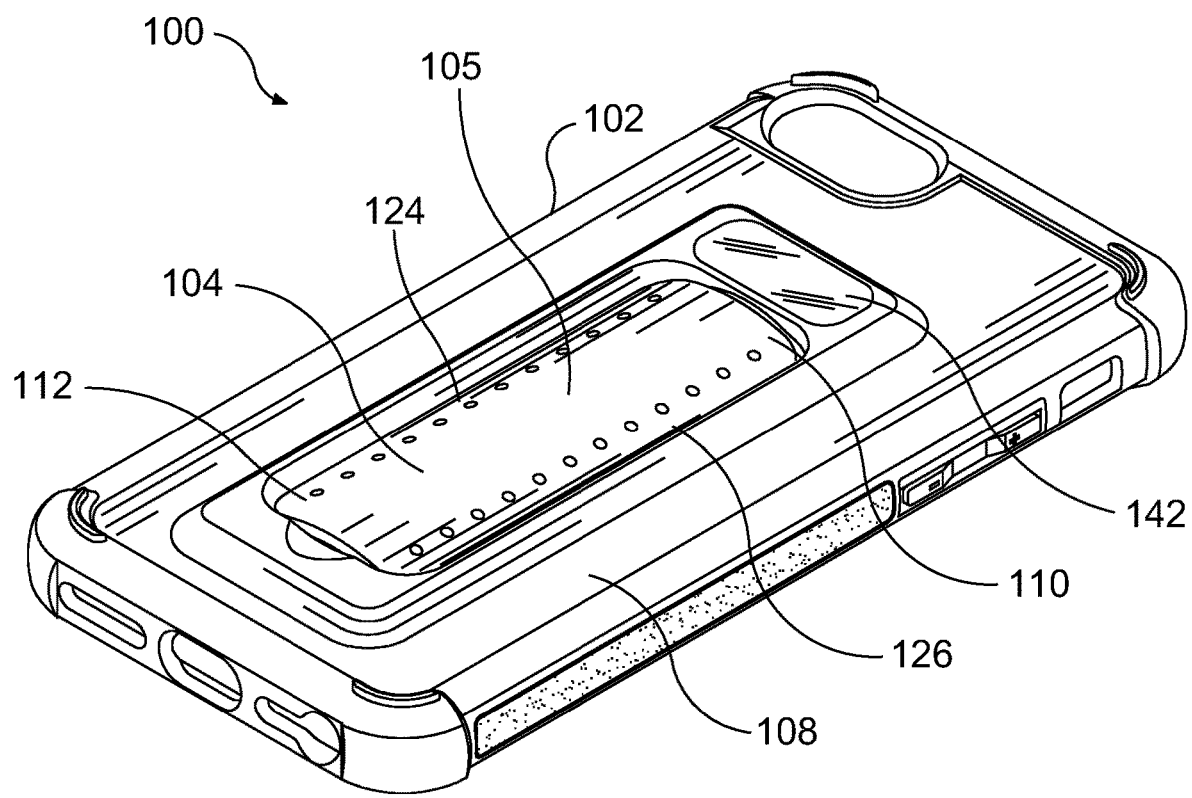
FIG. 1 is a perspective view of the front-right side of a first embodiment of the present disclosure with a bistable spring in a first position.
Figure 2:
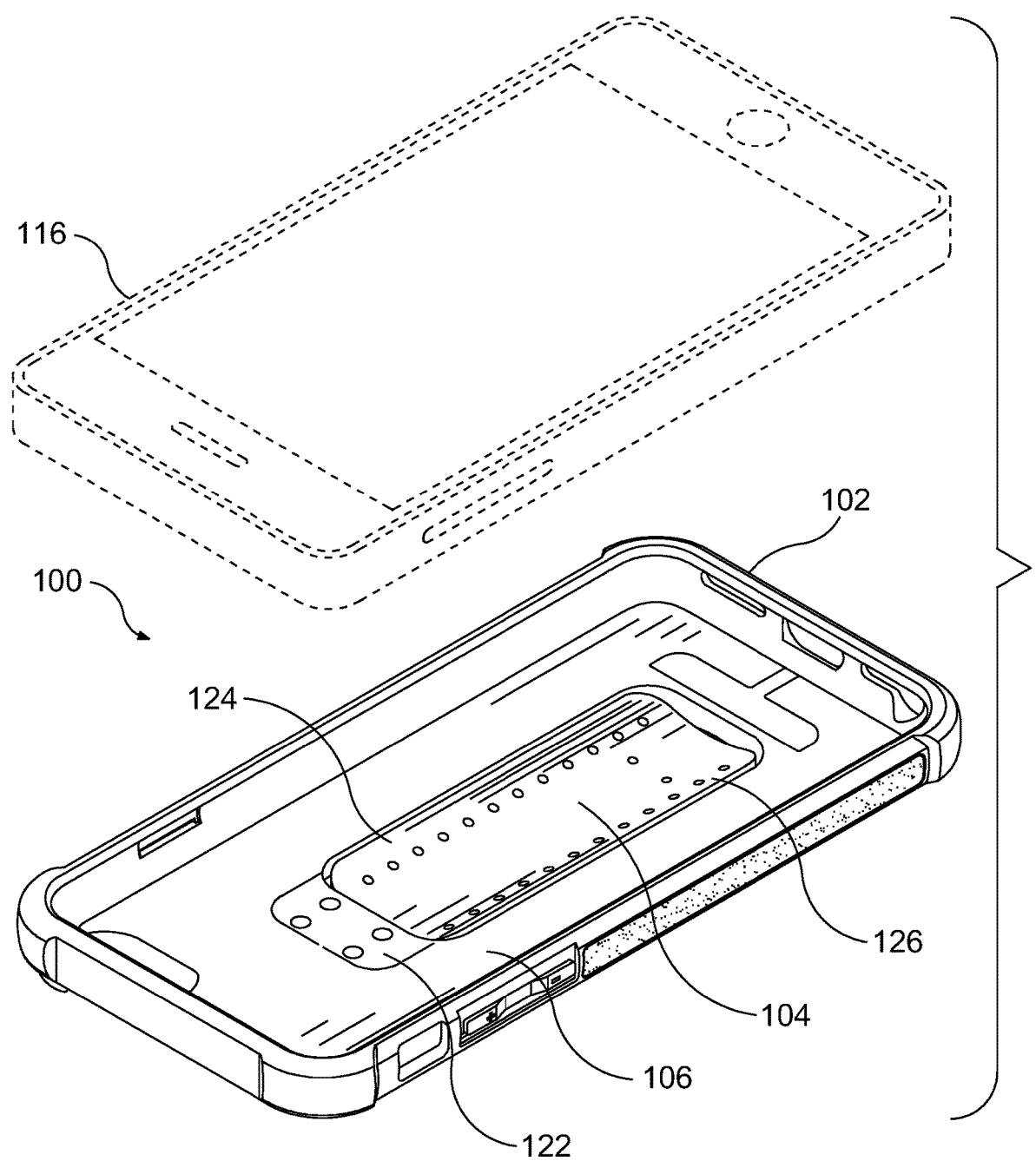
FIG. 2 is a perspective view of the rear-right side of the embodiment of FIG. 1 with the bistable spring in a first position, shown with an illustrative handheld device.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Depicted in FIGS. 1-4, 5A, 5B, 6B, and 7-8 are embodiments of a bistable spring stand and housing apparatus 100 for a handheld device 116 of the present disclosure. The apparatus 100 can include a housing 102 and a bistable spring stand 104. The housing 102 has a first (rear) side 106 (shown in FIG. 2) and a second (front) side 108 (shown in FIGS. 1 and 3). A handheld device 116 can be securely received within or attached to the first side 106 of the housing 102. Although the illustrated embodiments depict the first side 106 to include an opening for inserting and/or directly interacting with a handheld device 116, it should be appreciated that various embodiments of housings could be implemented, for example, a housing which closes over the handheld device 116 to shield it from water and dust and/or a housing with an opening located elsewhere for inserting the handheld device 116.

Figure 3:
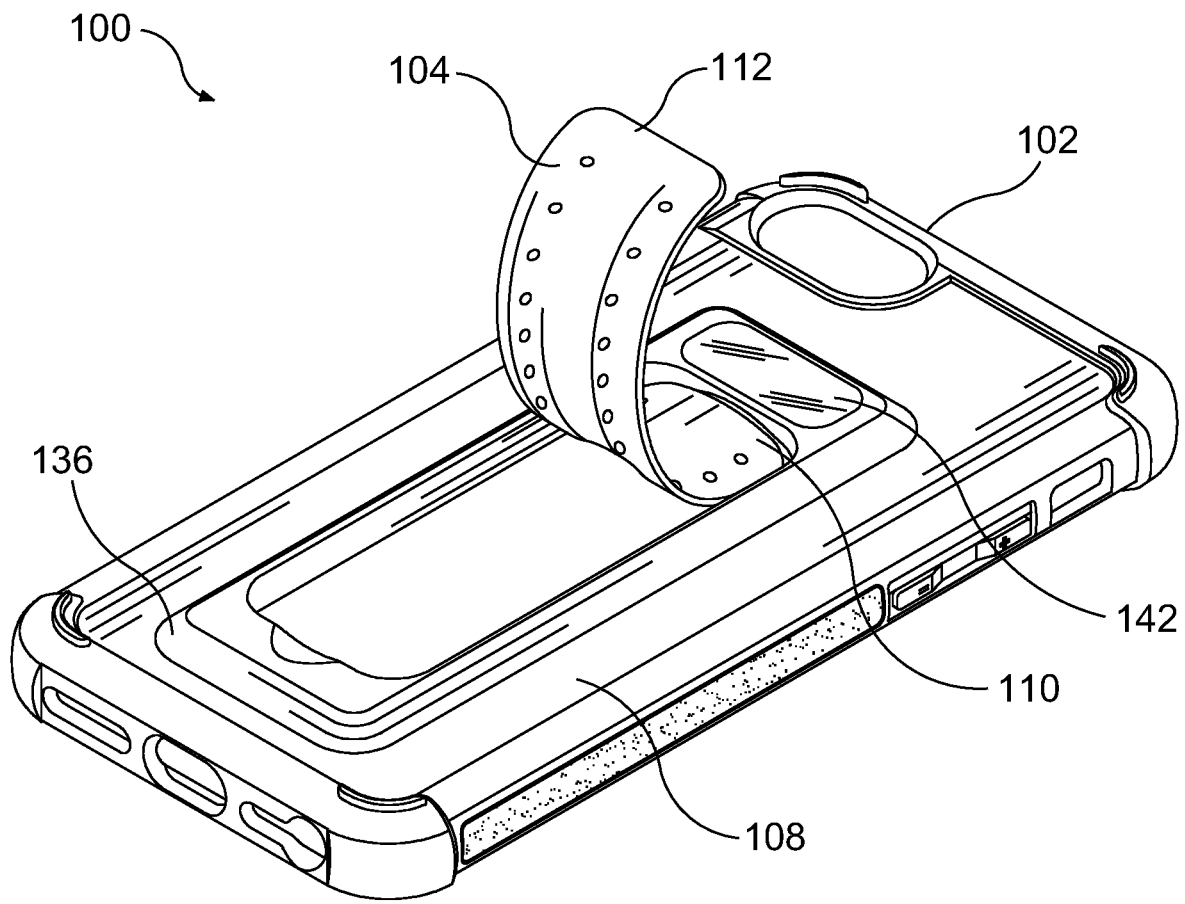
FIG. 3 is a perspective view of the front-right side of the embodiment of FIG. 1 with the bistable spring in a second position.
Figure 4:
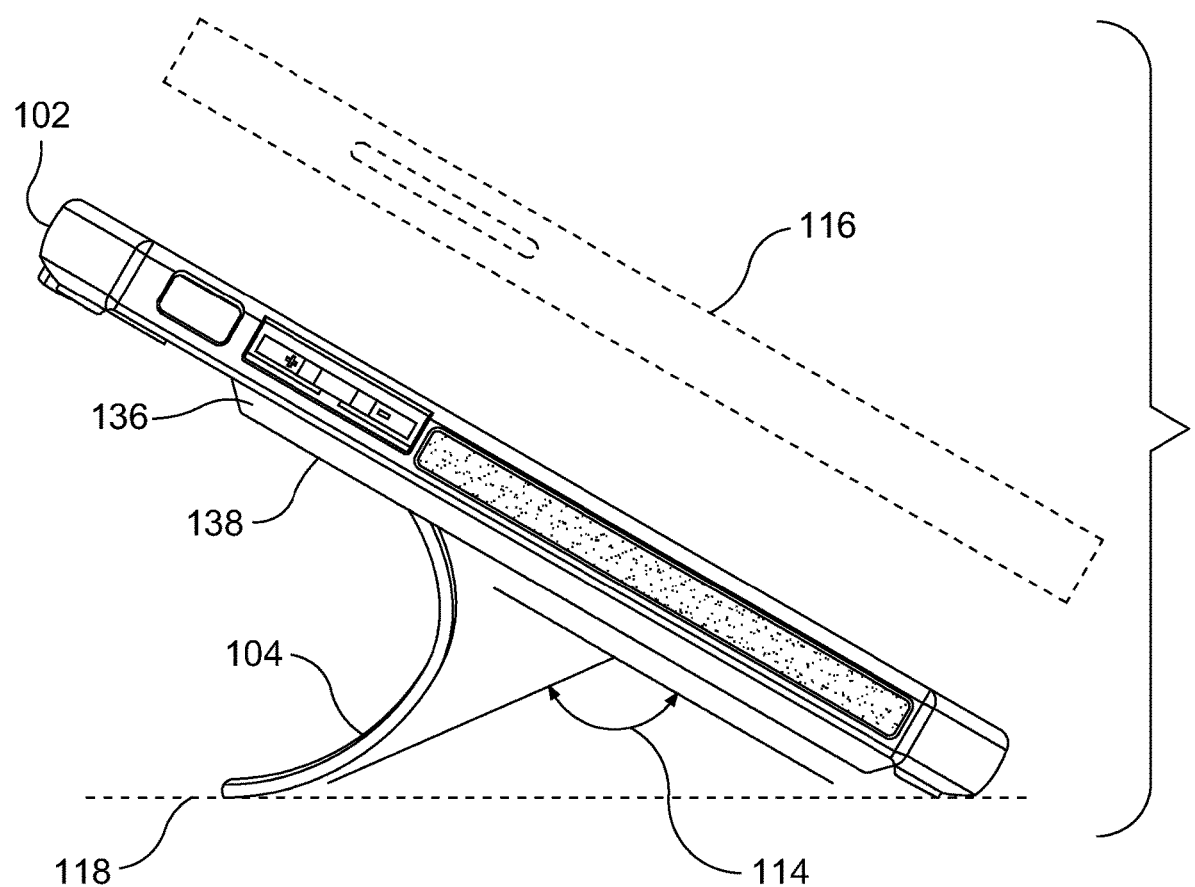
FIG. 4 is a right side view of the embodiment of FIG. 1 with the bistable spring in a second position, shown positioned on a surface and with an illustrative handheld device.
Figure 5A:
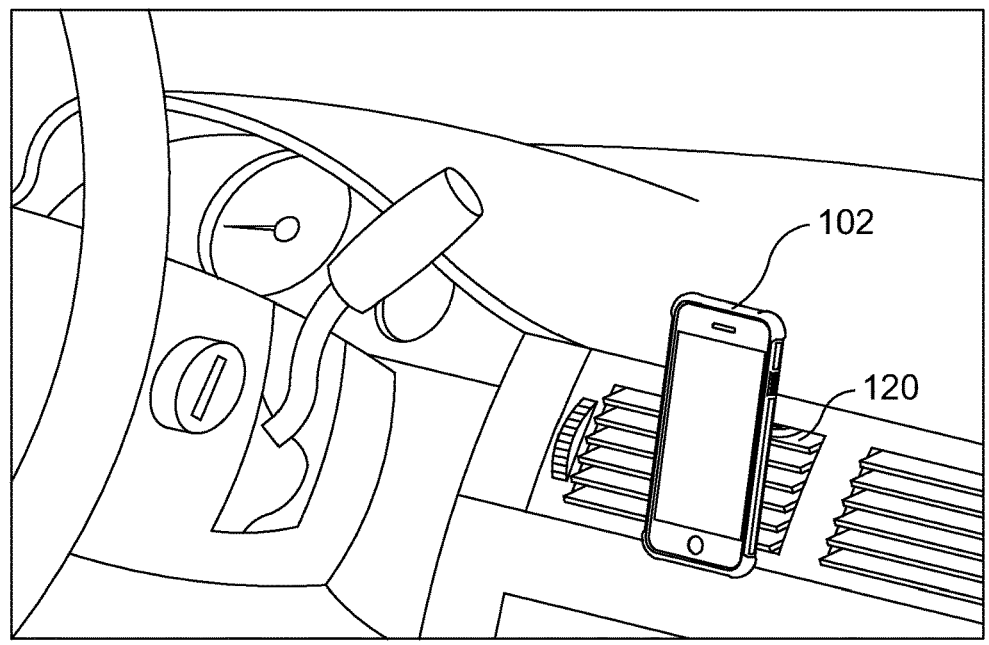
FIG. 5A is a perspective view of the rear-left side of a second embodiment of the present disclosure, shown attached to an illustrative handheld device with a bistable spring in a second position and mounted to a vehicle air vent.

The bistable spring stand 104 is coupled to the housing 102 and includes a retracted first position (shown in FIGS. 1 and 2) and an extended second ("kick stand") position (shown in FIGS. 3, 4, 5A. and 5B). The bistable spring stand 104 is stable in each position but can be mechanically actuated between the first and second positions. The bistable spring stand 104 has an outward facing surface 105 which is substantially flat along its length between first end 110 and second end 112 in the first position and has a curvature translating the second end 112 through more than 90 degrees, or alternatively more than 110 degrees, in the second position as shown in FIG. 4 as angle 114. For housings 102 which are designed for handheld devices 116 such as, for example, smartphones, the bistable spring stand 104 may be between 20 millimeters and 30 millimeters wide between the first edge 124 and the second edge 126, between 60 millimeters and 90 millimeters tall between the first end 110 and the second end 112, and between 1 millimeter and 4 millimeters thick. In certain embodiments, particularly for some smartphones, the bistable spring stand 104 may be 25 millimeters wide, about 70 millimeters tall, and about 2 millimeters thick.

The first end 110 of the bistable spring stand 104 is attached to a mounting surface 122 of housing 102 (shown in FIG. 2), wherein the mounting surface 122 can be a position that is embedded within the housing 102. The first end 110 defines a lateral curve (shown in FIG. 6B) adjacent end 112 between edges 124 and 126 when the bistable spring stand 104 is in either of the first and second positions. In any position, the second end 112 and edges 124, 126 can remain free and disconnected from the housing 102.

Referring to FIG. 3, the second end 112 of the bistable spring stand 104 in the second position can be located above and between the first end 110 and the second end 112 of the bistable spring stand 104 in the first position, and in particular, past a midpoint between ends 110 and 112 so that in the second position the end 112 is closer to the end 110 than end 112 in the first position. Additionally, the second end 112 in the second position rotates to a location above a point near to but just short of a midpoint between the ends of housing 102. The second end 112 of the bistable spring stand 104 in the second position is about perpendicular to the bistable spring stand 104 in the first position. The bistable spring stand 104 moves from the first position into the second position when pressure is applied in the area between the first end 110 and the second end 112 and the bistable spring stand 104 returns to the first position when pressure applied to the second end 112 toward the housing 102.

Referring to FIG. 4, the longitudinal curvature of bistable spring stand 104 in the second position can support a handheld device 116 on a surface 118. Although the apparatus is shown supported by the bistable spring stand 104 in a vertical orientation, it should be appreciated that the apparatus 100 can also be supported by the bistable spring while the apparatus 100 is in a horizontal (laying on its side) orientation on a surface 118.

Figure 5B:
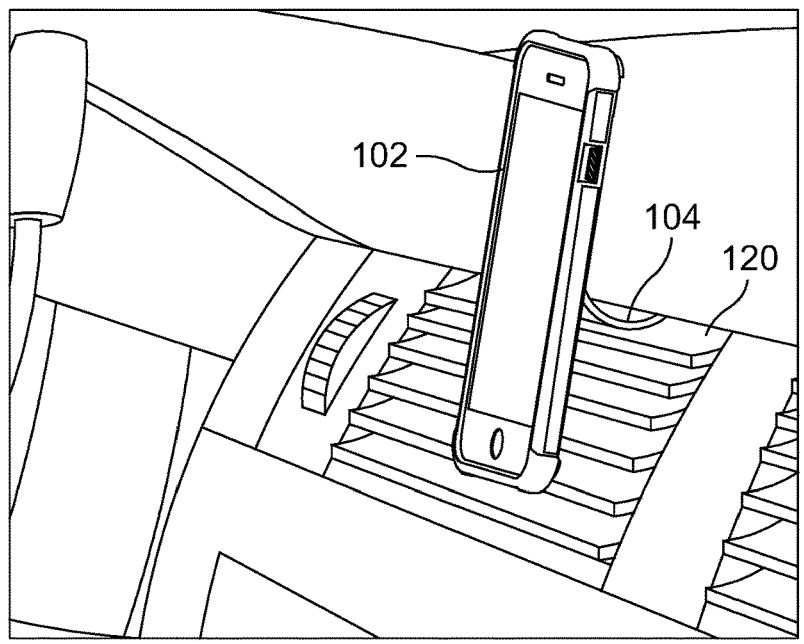
FIG. 5B is a perspective view of the left side of the embodiment of FIG. 8A, shown attached to a handheld device with the bistable spring in the second position and mounted to a vehicle air vent.

Referring to FIGS. 5A and 5B, the longitudinal curvature of bistable spring stand 104 in the second position can also support a handheld device from a slot 120 in an elevated position for easy use and viewing. The bistable spring stand 104 can be inserted into any slot 120, for example, an air vent or a compact disc (CD) insert on the dashboard of a vehicle, which provides enough frictional grip with the bistable spring stand 104 to support the mounting of the apparatus 100. The lateral curve of the bistable spring stand 104 in the first position is convex along the entire length away from the second surface 108 of housing 102 (shown in FIG. 6B). The lateral curve of the bistable spring stand 104 in the second position flattens along the entire length toward second surface 108 of housing 102, thereby enabling a distal second end 112 portion of the length to more easily be flexed from being longitudinally curved to flatter to be received in a slot 120. Upon entry of the second end 112 within the slot 120, flexing of the second end 112 to its longitudinally curved second position aids retention of the accessory 100 by the slot 120 in that the longitudinal curve will cause bistable spring stand 104 to be in contact with both upper and lower opening surfaces of slot 120. In contrast, prior art apparatuses with extendable stands lack a sufficient longitudinal curve (straight or large radius) and are not well retained within slot 120, or have too much of a longitudinal curve (small radius) and/or resist flexing to a straightened longitudinal curve at a distal end such that it is difficult or not possible to insert the distal end within a slot 120. For example, typical prior art apparatuses 100 provide an angle 114 of rotation which is less than about 90 degrees.

Figure 6A:
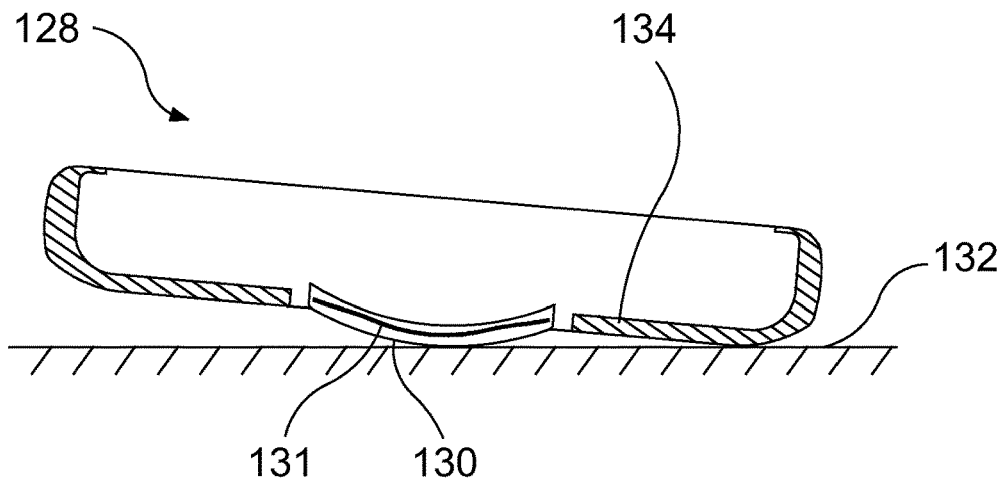
FIG. 6A is an endwise cross section view of a first prior art embodiment, shown with a bistable spring in a first position and positioned on a surface.

Depicted in FIG. 6A is an apparatus 128 of the prior art having a bistable spring stand 130 comprised of a bistable spring 131 embedded within a flexible coating material. As shown, prior art apparatuses with bistable spring stands 130 are unstable when resting on a flat surface 132 due to the curved bistable spring surface protruding beyond the housing surface 134 of the apparatus 128. The prior art design causes the apparatus 128 to rock from side to side as pressure is placed to the housing 134 or associated handheld device. Further, these apparatuses 128 are often placed within a user's pant pocket or purse while not in use. While in a user's pocket or purse, pressure can commonly occur to the protruding bistable spring stand 130 surface thereby causing the bistable spring to unexpectedly and/or unintentionally extend to a "kick stand" position, similar to the second stable position of the apparatus 100 of the present disclosure (shown in FIG. 3). Unintentional kick stand extension can be an inconvenience for a user as it can make it difficult to retrieve the handheld device and apparatus 128 from the pocket or purse.

Figure 6B:
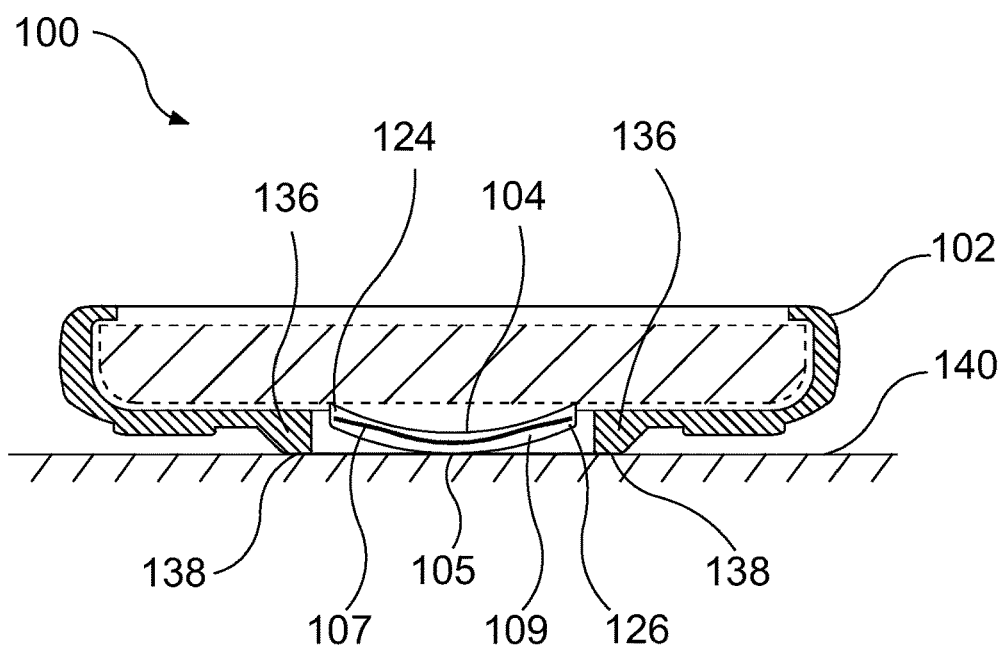
FIG. 6B is an endwise cross section view of a third embodiment of the present disclosure, shown with a bistable spring in a first position and positioned on a surface.
Figure 7:
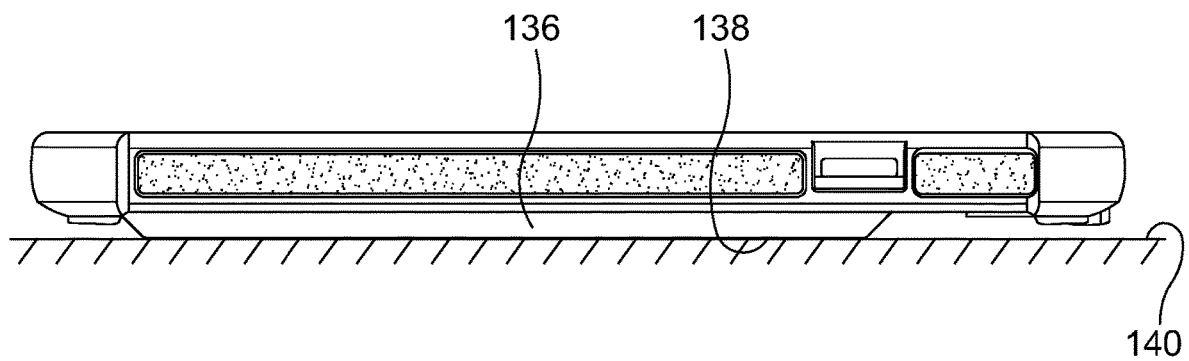
FIG. 7 is a side view of a fourth embodiment of the present disclosure, shown positioned on a surface.

As such, depicted in FIGS. 6B and 7 is an improved apparatus 100 of the present disclosure which solves the problems of the prior art described above. The apparatus 100 includes a plurality of raised members 136 located on the second side of the housing 102 which define a planar support surface 138 protecting the bistable spring stand 104 from unintended contact and/or pressure and for supporting the housing and handheld device when resting on a planar surface. The raised members 136 can include at least one member adjacent each side of the bistable spring stand 104 such that the raised members 136 collectively define a protruding perimeter around the bistable spring stand 104 (as depicted in FIGS. 1 and 3) which includes adequate support to restrict tilting or rocking movement (e.g., the four planar corners of support around the perimeter depicted in the embodiment of FIGS. 1 and 3). The apparatus is therefore capable of lying flat without rocking from side to side or end to end when resting on a surface or being contacted by a user as the raised members 136 provide a stable planar support surface which securely rests on a planar resting surface 140 (e.g., a tabletop). More specifically, the raised members 136 protect the outward facing surface 105 of the bistable spring stand 104 from receiving contact from a planar surface 140 while the apparatus 100 is resting on the planar surface 140. Further, the raised members 136 protect the outward facing surface 105 of the bistable spring stand 104 from receiving unintended contact or pressure and the bistable spring stand 104 unexpectedly extending to the second position, whether when carried in a user's pant pocket or in other similar environments.

The bistable spring stand of the present disclosure is comprised of a bistable spring 107 embedded within a flexible coating material 109. The bistable spring 107 can be constructed with a metal material such that the material, constructions, and first and second positions of bistable spring 107 can be the same or similar to spring steel or roll-up metal tape measures or plastic and metal "slap" bracelets, oftentimes manufactured by bending a flat spring steel on both sides through a series of rollers. The bistable spring 107 material may be 1095 or 1075 spring steel and may have a thickness of between 0.1 millimeters and 1 millimeter. In certain embodiments, particularly for some smartphones, the bistable spring 107 is about 0.2 millimeters. Advantageously, the bistable spring 107, and thus the bistable spring stand 104, consistently actuates to the same radius and longitudinal curvature in the second position.

The flexible coating material 109 is a flexible plastic coating with a stiffness that is overcome by moving the spring between the first and second positions. The material 109 can also resist the longitudinal curvature and thus limit the radius of the longitudinal curvature of the bistable spring stand 104 in the second position.

Figure 8:
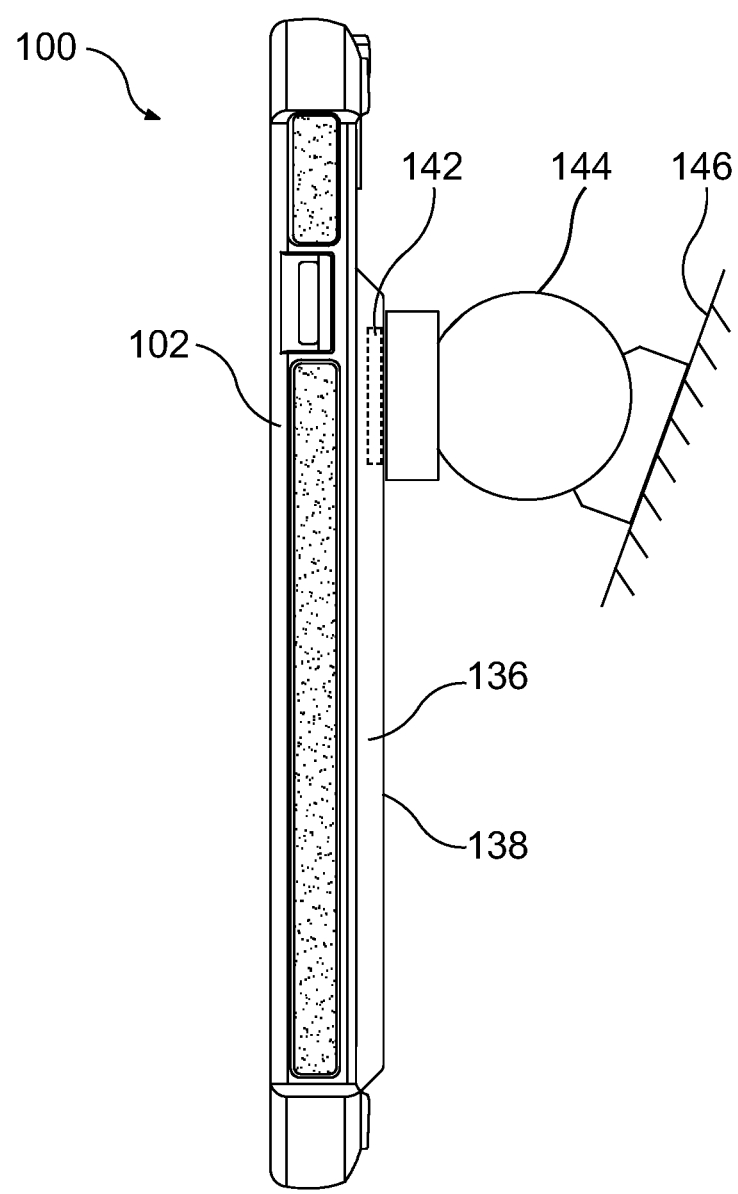
FIG. 8 is a side view of a fifth embodiment of the present disclosure, shown with a ferromagnetic member joined to an illustrative magnetic mounting accessory.

Depicted in FIG. 8, the apparatus 100 of the present disclosure can also include a ferromagnetic member 142 (e.g., a ferrous or metal badge) which covers an area about as wide as the bistable spring at or near the connection point 122. The ferromagnetic member 142 allows the apparatus 100 and associated handheld device to be magnetically mounted to a mounting accessory 144. Common mounting accessories 144 are used to affix handheld devices in environments requiring hands-free use, such as in vehicles. The mounting accessories generally attach to a mounting surface 146, e.g., a vehicle dashboard, vent, or windshield.

The ferromagnetic member 142 of the present disclosure provides many advantages over the prior at, such as by providing an alternative mounting method in circumstances where an adequate slot is not provided for mounting using the bistable spring. A secure and reliable magnetic mounting surface is provided by coupling the ferromagnetic member 142 to the raised members 136 making up the planar support surface 138. Preferably, the ferromagnetic member 142 is at least partially embedded within the raised members 136 or otherwise coupled such that outward facing surface of the ferromagnetic member 142 is planar with the raised members 136 and forms a portion of the planar support surface 138. Therefore, the ferromagnetic member 142 provides an advantageous planar surface area which magnetically supports the size and weight of the apparatus 100 and any commonly-associated handheld device when mounted in a vertical position.

The ferromagnetic member 142 can be made of any ferromagnetic material such as, for example, 400 series stainless steel. For housings 102 which are designed for handheld devices 116 such as, for example, smartphones, the ferromagnetic member 142 may be about one-half millimeter thick, about 25 millimeters wide, and about 11 millimeters tall. For housings 102 designed for handheld devices 116 which are larger in size or weight than a common smartphone, a ferromagnetic member 142 having greater dimensions may be required to support the larger handheld device 116. The ferromagnetic member 142 may include a reflective or mirror-like surface and/or may provide a placement for decorative branding such as, for example, a logo or design. Additionally, the ferromagnetic member 142 can be used to cover the connection point between the housing 102 and the bistable spring stand 104, including covering any cosmetic imperfections due to manufacturing the apparatus 100 or those resulting from bonding the housing 102 to the bistable spring stand 104.

The ferromagnetic member 142 can be located anywhere along planar support surface 138 of which it is capable of coupling to a mounting accessory 144 such as, for example, near the first end 110 and adjacent to the mounting surface 122 of the bistable spring stand 104. The ferromagnetic member 142 does not interfere with the bistable spring stand 104 in either its first or second positions.

Reference systems that may be used herein can refer generally to various directions and/or positions (e.g., upper, lower, forward, rearward, top, bottom, and side), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

Element Numbering

The following is a list of element numbers and at least one noun used to describe that element. It is understood that none of the embodiments disclosed herein are limited to these descriptions, and these element numbers can further include other words that would be understood by a person of ordinary skill reading and reviewing this disclosure in its entirety.

| Ref. No. | Description |
| --- | --- |
| 100 | Bistable Spring Stand and Housing Accessory |
| 102 | Housing |
| 104 | Bistable Spring Stand |
| 105 | Outward Facing Surface (Bistable Spring) |
| 106 | First (Rear) Side of Housing |
| 107 | Bistable Spring |
| 108 | Second (Front Side of Housing) |
| 109 | Flexible Coating |
| 110 | First End (Bistable Spring) |
| 112 | Second End (Bistable Spring) |
| 114 | Angle of Curvature (Bistable Spring in Second Position) |
| 116 | Handheld Device |
| 118 | Surface |
| 120 | Slot |
| 122 | Mounting Surface (Bistable Spring) |
| 124 | First Edge (Bistable Spring) |
| 126 | Second Edge (Bistable Spring) |
| 128 | Apparatus of Prior Art |
| 130 | Bistable Spring Stand of Prior Art |
| 131 | Bistable Spring of Prior Art |
| 132 | Flat Surface |
| 134 | Housing of Prior Art |
| 136 | Plurality of Raised Members |
| 138 | Planar Support Surface |
| 140 | Flat Surface |
| 142 | Ferromagnetic Member |
| 144 | Magnetic Mounting Accessory |
| 146 | Mounting Surface |

What is claimed is:

1. An apparatus for a handheld device, comprising:
a housing having a first side and a second side;
a plurality of raised members located on the second side of the housing and defining a planar support surface, wherein the planar support surface includes a recess; and
a bistable support member coupled to the housing within the recess and having a first end and a second end, and defining an external surface facing outward therebetween;
wherein the bistable support member is moveable between a first position and a second position, in the first position the bistable support member is substantially flat between the first and second end, and in the second position the bistable support member defines a longitudinal curve outward from the housing; and
wherein the bistable support member is recessed within the planar support surface while in the first position such that the plurality of raised members extend perpendicularly a distance from the housing which is greater than that of the outward facing external surface of the bistable support member.

2. The apparatus of claim 1, wherein a ferromagnetic member is coupled to at least one of the plurality of raised members.

3. The apparatus of claim 1, wherein the first side of the housing is configured to be coupled to a handheld device.

4. The apparatus of claim 1, wherein the plurality of raised members includes at least one raised member adjacent each side of the bistable support member.

5. The apparatus of claim 1, wherein the plurality of raised members defines a continuous raised perimeter around the bistable support member.

6. The apparatus of claim 1, wherein the second end of the bistable support member rotates through greater than 90 degrees in moving from the first position to the second position.

7. The apparatus of claim 1, wherein the bistable support member is pretensioned to repeatedly actuate to a consistent second position.

8. The apparatus of claim 1, wherein the bistable support member includes a flexible plastic cover encapsulating a bistable spring.

9. An apparatus for a handheld device, comprising:
a housing having a first side and a second side, wherein the second side defines a base surface;
a ferromagnetic member coupled to the second side of the housing;
a moveable support member including a bistable spring embedded within a deformable coating, wherein the moveable support member is coupled to the housing and having a first end and a second end, and defining an outward facing surface therebetween; and
a plurality of raised members located on the second side of the housing;
wherein the moveable support member is moveable between a first position and a second position, in the first position the moveable support member is substantially flat between the first and second end, and in the second position the moveable support member defines a longitudinal curve outward from the base surface; and
wherein the plurality of raised members extends perpendicularly from the base surface and defines a planar support surface, wherein the planar support surface includes a recess, wherein the moveable support member is positioned within the recess, wherein the planar support surface is disposed a distance from the base surface which is greater than that of the outward facing surface of the moveable support member.

10. The apparatus of claim 9, wherein the plurality of raised members includes at least one raised member adjacent each side of the moveable support member.

11. The apparatus of claim 9, wherein the plurality of raised members defines a continuous raised perimeter around the moveable support member.

12. The apparatus of claim 9, wherein the second end of the moveable support member rotates through greater than 90 degrees in moving from the first position to the second position.

13. The apparatus of claim 9, wherein the moveable support member is pretensioned to repeatedly actuate consistently to the second position.

14. The apparatus of claim 9, wherein the ferromagnetic member includes an outer surface coplanar with the planar support surface defined by the plurality of raised members.

15. The apparatus of claim 9, wherein the moveable support member is configured to transition from the first position to the second position upon receiving radial pressure on the outward facing surface between the first end and the second end.

16. An apparatus for a handheld device, comprising:
a housing having a first side and a second side, wherein the second side defines a base surface;
a plurality of raised members extending from the base surface of the housing and defining a planar support surface, wherein the planar support surface includes a recess;
a bistable support member coupled to the housing within the recess and having a first end and a second end, and defining an outward facing surface therebetween; and
a ferromagnetic member coupled to at least one of the plurality of raised members;
wherein the bistable support member is moveable between a first position and a second position, in the first position the bistable support member is substantially flat between the first and second end, and in the second position the bistable support member defines a longitudinal curve outward from the housing; and
wherein the outward facing surface of the bistable support member is recessed within the planar support surface while in the first position such that the plurality of raised members extend perpendicularly a distance from the housing which is greater than that of the outward facing surface of the bistable support member.

17. The apparatus of claim 16, wherein the plurality of raised members includes at least one raised member adjacent each side of the bistable support member.

18. The apparatus of claim 16, wherein the plurality of raised members defines a continuous raised perimeter around the bistable support member.

19. The apparatus of claim 16, wherein the second end of the bistable support member rotates through greater than 90 degrees in moving from the first position to the second position.

20. The apparatus of claim 16, wherein the ferromagnetic member includes an outer surface coplanar with the planar support surface defined by the plurality of raised members.

21. The apparatus of claim 16, wherein the bistable support member includes a bistable spring, wherein the bistable spring includes steel.

* * * * *